United States Patent
De Bien

(10) Patent No.: US 6,629,511 B2
(45) Date of Patent: *Oct. 7, 2003

(54) QUICK RELEASE LEASH AND QUICK RELEASE COUPLING ASSEMBLY

(76) Inventor: Humberto De Bien, 9162 Whipporwill Trail, Jupiter, FL (US) 33478

( * ) Notice: Subject to any disclaimer, the term of this patent is extended or adjusted under 35 U.S.C. 154(b) by 123 days.

This patent is subject to a terminal disclaimer.

(21) Appl. No.: 09/867,338

(22) Filed: May 29, 2001

(65) Prior Publication Data

US 2001/0037774 A1 Nov. 8, 2001

Related U.S. Application Data

(63) Continuation-in-part of application No. 09/195,965, filed on Nov. 19, 1998, now Pat. No. 6,247,427, which is a continuation-in-part of application No. 08/958,111, filed on Oct. 28, 1997, now abandoned.
(60) Provisional application No. 60/029,573, filed on Oct. 28, 1996.

(51) Int. Cl.$^7$ .............................................. A01K 27/00
(52) U.S. Cl. ..................................................... 119/776
(58) Field of Search ................. 119/792, 769, 119/772, 776, 865, 796; 464/29; 403/327, 328, DIG. 1; 242/390.8, 396.7, 396.8, 402, 250

(56) References Cited

U.S. PATENT DOCUMENTS 5,103,771 A * 4/1992 Lee .............................. 119/110

* cited by examiner

Primary Examiner—Thomas Price
(74) Attorney, Agent, or Firm—Malloy & Malloy, P.A.

(57) ABSTRACT

A leash assembly designed to accomplish a quick release or detachment of an animal from its tethered position and/or a quick re-attachment into a tethered position, the assembly including a lead having a release structure which may be axially movable along the length of the lead. A distal end of the release cable is connected to a rotating coupling assembly structured to removably connect a collar, harness, or similar attachment assembly to the distal end of the lead. An activation assembly may be connected adjacent to the proximal end of the lead and which when selectively positioned serves to orient the release structure into a disconnect position relative to the coupling assembly such that the components may be easily released. A quick release coupling assembly, of the type utilized by the leash assembly, is also provided for use in numerous other connection applications.

50 Claims, 7 Drawing Sheets

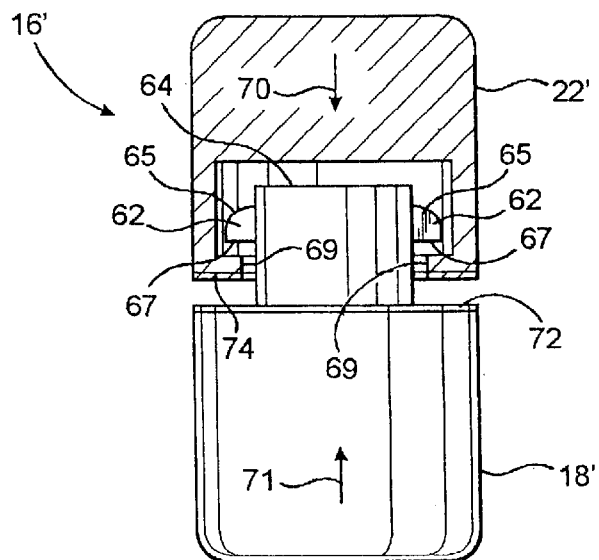
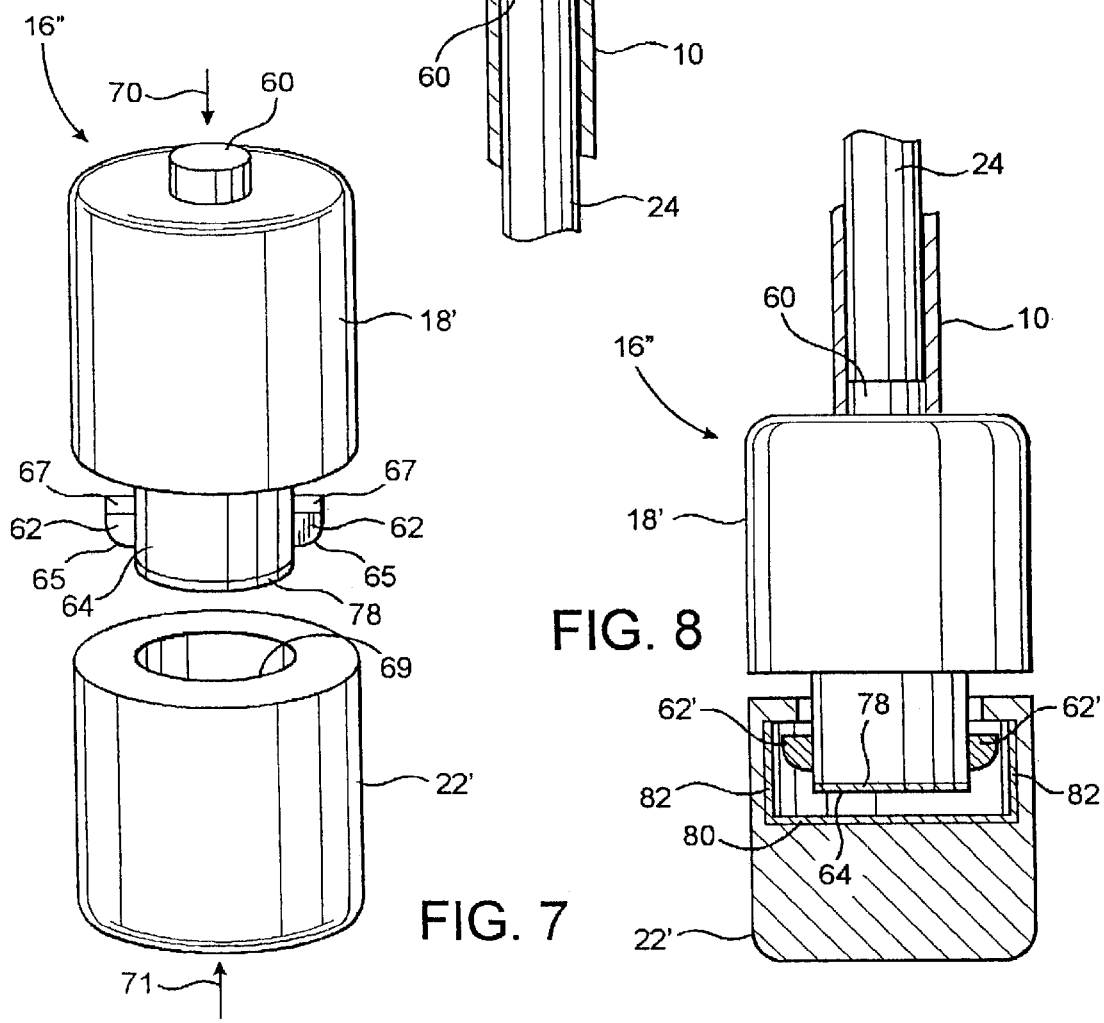
FIG. 6
FIG. 7
FIG. 8

QUICK RELEASE LEASH AND QUICK RELEASE COUPLING ASSEMBLY

This is a Continuation in part application of presently pending U.S. patent application Ser. No. 09/195,965 filed on Nov. 19, 1998 now U.S. Pat. No. 6,247,427, which is incorporated by reference in its entirety herein, and which is a continuation in part of U.S. patent application Ser. No. 08/958,111 filed on Oct. 28, 1997, now abandoned, which also claims priority under 35 U.S.C. Section 119(e) to provisional patent application having Serial No. 60/029,573 and a filing date of Oct. 28, 1996.

BACKGROUND OF THE INVENTION

1. Field of the Invention

The present invention is directed to a leash assembly designed to quickly and efficiently attach an animal to and release an animal from a lead normally used to restrain or control the animal when connected thereto, and to a quick release coupling assembly which the leash assembly incorporates.

2. Description of the Related Art

It is widely known that there are millions of dog owners in this country as well as other countries throughout the world. Dogs comprise one of the most popular types of animals for household pets. Of course, dogs are extremely popular animals for other than simple companionship. Other uses of dogs include working dogs and show dogs. In turn, working dogs may be classified as dogs utilized for police enforcement purposes, military activities, dogs trained for hunting and also dogs specifically trained to aid those individuals who are visually impaired.

Regardless of the above classifications, the care and maintenance of dogs require the use of numerous auxiliary or supplementary items. Among the most popular is the dog leash or tethering apparatus wherein dogs are retained and/or restricted for purposes of control when not contained by fences in a yard or like area. Moreover, similar type leash assemblies are also useful on a variety of different animals including pets and farm animals, such as horses.

It is also well recognized that leash structures, collars, harnesses, etc. are available in numerous and varying designs intended to control an animal for different purposes. Prior art structures exist which comprise leash and collar combinations specifically structured such that the length of a lead of the leash assembly is selectively variable so that the dog or animal being tethered may enjoy a greater range of movement and freedom when the surrounding area allows. Alternately, the tethered animal may be better controlled, by shortening the length of the extendable lead in areas which do not allow the free roaming of the dog. Other prior art leash or tethering assemblies are specifically designed to allow control and retention of the dog or other animal while significantly reducing or eliminating the tangling of the dog in the retaining harness and/or about an anchoring structure to which the animal is tethered.

One area not specifically addressed by prior or related art leash and retaining harness assemblies, however, is the ability to quickly and effectively provide for both the quick connection and disconnection of an animal to and from the leash assembly. In the majority of conventional or known leash assemblies, it is necessary for a handler to manipulate a coupling structure utilizing both hands, wherein the coupling structure serves to connect the distal end of the lead to the collar or retaining harness mounted on the animal. This generally involves direct handling or manipulation of any one of a large variety of such coupling structures. Attachment of the animal can be extremely difficult, particularly when the dog or animal being tethered is overly frisky or otherwise in an excited state. Also, in accomplishing either attachment or detachment of the lead from the collar or like harness particular problems are encountered by the elderly or by those who are visually or otherwise physically challenged. In addition to the above, the handling of larger animals, such as horses and/or working dogs of the type trained to conduct police enforcement and/or military activities, requires that the animal be kept under control by the handler. However, in cases of emergency, it is equally important that the animal be released or detached from his controlling lead as quickly as possible as it could be dangerous for the animal to begin running while dragging the lead or any part of the leash assembly. Conversely, if the animal is loose, it may be necessary to quickly re-harness the animal in order to restrain its movement in a hazardous situation.

Accordingly, there is a recognized need in this area for a leash or tethering assembly which is specifically structured to accomplish a quick and efficient attachment or detachment of the animal, as well as quick and effective restraint of the animal. Such release should not require the direct manipulation of a coupling connector which serves to attach the distal end of a lead to the collar or harness mounted on the animal. Further, such a preferred leash assembly should be structured such that a quick and effective detachment or release of the animal can be accomplished through a manipulation of release or activating structures located a spaced distance from the animal and from the actual rotating coupling member serving to connect the animal harness to the lead.

As set forth above, retractable leash and/or tethering devices for dogs and other animals are of course known. However, in order to maintain even greater control of the animal being tethered, it is desirable to combine certain advantages of a retractable lead with structure capable of accomplishing a quick and efficient detachment of the distal or free end of the lead from the collar or harness mounted on the animal. Retractable leash assemblies of the type commercially available are typically spring biased to the extent that a release mechanism allows a free extension of the lead structure as the tethered animal travels a greater distance from the handler. However, in these known devices, the lead cannot normally be retracted or rewound without the handler first providing slack in the lead by following or chasing the animal and thereby shortening the distance between the handler and the animal prior to rewinding the lead for storage.

Another problem existing with conventional leash assemblies is the ability to efficiently and quickly accomplish attachment of the free end of the lead to the harness. Typically, known devices include a variety of snap on couplings requiring the use of both hands of the handler to attach the lead to the harness. This presents a distinct problem particularly when the animal is excited to the extent of requiring the animal as well as the harness to be firmly gripped or held in order to maintain control of the animal during the attachment of the lead to the harness. Therefore, there is a need for a preferred quick release coupling assembly capable of accomplishing a quick and efficient attachment of the lead to a collar, harness or similar attachment assembly while requiring only a single hand of a user thereof. Further, such a quick release coupling assembly will have numerous other practical applications including, but not limited to, tie downs for tools and equipment, securing luggage and/or sporting equipment, temporary barrier devices, body harnesses, and key chains, just to name few.

SUMMARY OF THE INVENTION

The present invention relates to a leash assembly designed to allow control of a dog or other animal by a handler and which is structured to accomplish a quick detachment of the animal from a remote position without requiring the direct handling or manipulation of the coupling assembly serving to interconnect the collar, harness, or similar attachment assembly to the distal end of the lead. The present invention is also designed and structured to provide a quick and efficient attachment of a lead to an attachment assembly utilizing only a single hand of the user or handler. More specifically, the present invention comprises a flexible material lead being of any appropriate or preferred length and terminating at a distal end and an oppositely disposed proximal end. A preferably rotating coupling assembly is connected, at least in part, to the distal end of the lead and is specifically structured to accomplish a quick and easy attachment of the lead to the attachment assembly, as well as a quick release or detachment of the lead from an attachment assembly mounted directly on the animal being tethered.

In order to accomplish such quick release of the coupling assembly, the present invention further comprises a release structure preferably in the form of a release or positioning cable formed of metallic or other applicable material having sufficient structural integrity to be movable axially along its own length and exert an axially directed force on a coupling assembly to be described in greater detail hereinafter. The term "structural integrity" refers to the structural features of the release cable being of a material with sufficient rigidity, while still being flexible, to exert the aforementioned axially directed force on the coupling assembly or otherwise structured to be axially moveable along the length of the lead so as to exert the aforementioned force on the coupling assembly and thereby orient the coupling assembly in a disconnect position, as will be explained in greater detailed hereinafter.

The release structure or cable is mounted on and preferably within the interior of the lead structure and extends along the length thereof between the aforementioned distal end and proximal end. One end of the release cable is disposed adjacent the distal end of the lead and is connected directly to the preferably rotating coupling assembly. Selective axial movement of the release cable causes a disconnection of the coupling components defining the subject coupling assembly. The aforementioned quick release is thereby accomplished from a location remote from the animal without the necessity of directly handling or manipulating the coupling assembly. Alternate embodiments of the present invention include a coupling assembly comprising magnetically attractive components, and a release structure comprising an electromagnet whose polarity may be reversed to alternately facilitate the attachment and release of the components.

To accomplish the desired quick release, the present invention also includes an activation assembly mounted adjacent the proximal end of the lead structure and includes an activation member connected directly to the correspondingly positioned end of the release cable. Depending upon the various embodiments, to be described in greater detail hereinafter, the activation member may be disposed and configured for direct manipulation by a thumb or finger of a single hand of a person gripping a handle portion of the activation assembly which is connected to the proximal end of the lead. By depressing or otherwise manipulating the activation member, the release cable is forced to move axially along its length relative to the lead on which it is mounted. This movement will cause an axially directed force to be exerted directly on at least one of the coupling components of the coupling assembly and a disconnection of the coupling assembly. A quick release and/or detachment of the attachment assembly will thereby be effected. Additional embodiments of the present invention include an electronically operated activation assembly, which may or may not be radio activated.

Another feature of one preferred embodiment of the leash assembly of the present invention further includes an activation assembly comprising a drive motor to be actuated by a user. The drive motor is configured, such as by attachment to a take-up or storage spool, to effectuate storage of the lead itself and/or activation of the quick release structure.

An additional embodiment of the present invention includes the coupling assembly structured to provide a quick attachment and detachment of the distal, free end of the lead structure to the attachment assembly mounted on the animal. In addition, an equivalently structured coupling assembly may be used to connect opposite free ends of the attachment assembly to one another around the animal in an intended fashion. In the aforementioned coupling assembly, first and second components are structured so as to be attached to one another in a manner which only requires a single hand of the handler or user of the leash assembly of the present invention. Quick and easy release of the two components of the coupling assembly from one another is accomplished by manipulation of the activation assembly and movement of the release structure mounted within the lead, as set forth above. More specifically, each of the components of the present invention may be positioned into a predetermined aligned engagement with one another such that a pushing force exerted on the first and second components of the coupling assembly will cause a quick and efficient attachment of the two components to one another. Such quick attachment can be accomplished without manipulation of a spring biased plunger normally associated with generally known, swivel type coupling assemblies. Further, the coupling assembly may include an alignment assembly structured and disposed to facilitate the aforementioned predetermined aligned engagement of the components with one another. The alignment assembly preferably comprises magnetic surfaces on each component of the coupling assembly cooperatively disposed in engageable relation with one another when the components are aligned.

It is an object of the present invention to provide a leash assembly which is strong and secure, yet which also provides for the quick and easy release of the animal restrained thereby.

A further object of the present invention is to provide a leash assembly which is substantially easy to operate and does not require direct user manipulation of a coupling assembly when connecting the attachment assembly on the animal to a lead structure associated with the leash assembly.

It is also an important object of the present invention to provide a leash assembly structured to facilitate rapid and efficient connection of an attachment assembly, mounted on the animal, to a lead structure in a manner which requires minimal manipulation and the use of only one hand of the animal handler.

Yet another object to the present invention is to provide a leash assembly including a lead which may be retracted or extended in a controlled manner whether or not the free end of the lead structure is secured to the attachment assembly.

It is also an important object to the present invention to provide the leash assembly, including the various operative components associated therewith, which is formed from a light weight yet durable material so as to be operable over an extended period and which is structurally designed to be produced or manufactured relatively inexpensively so as to make the present invention available to a wide range of potential customers.

It is a further object of this invention to provide a quick release coupling assembly which may be utilized in a variety of other connection applications. The need for a quick release and/or attachment coupling exists in many applications, for example, tie downs for equipment, tools, or machinery, securing luggage and/or sporting equipment, temporary barrier devices, body harnesses, and key chains. Thus, the present invention provides such a quick release coupling assembly for the aforementioned applications, however, the present invention may be utilized in numerous other connection applications as may easily be envisioned.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 6 is a detailed view in partial cut away and section showing structural details of one preferred embodiment of the coupling assembly of the present invention.

FIG. 7 is a perspective view in partially exploded form of another preferred embodiment of the coupling assembly associated with the present invention.

FIG. 8 is a front plan view of the embodiment of FIG. 7 in a connected position.

Like reference numerals refer to like parts throughout the several views of the drawings.

DETAILED DESCRIPTION OF THE PREFERRED EMBODIMENT

Figure 1:
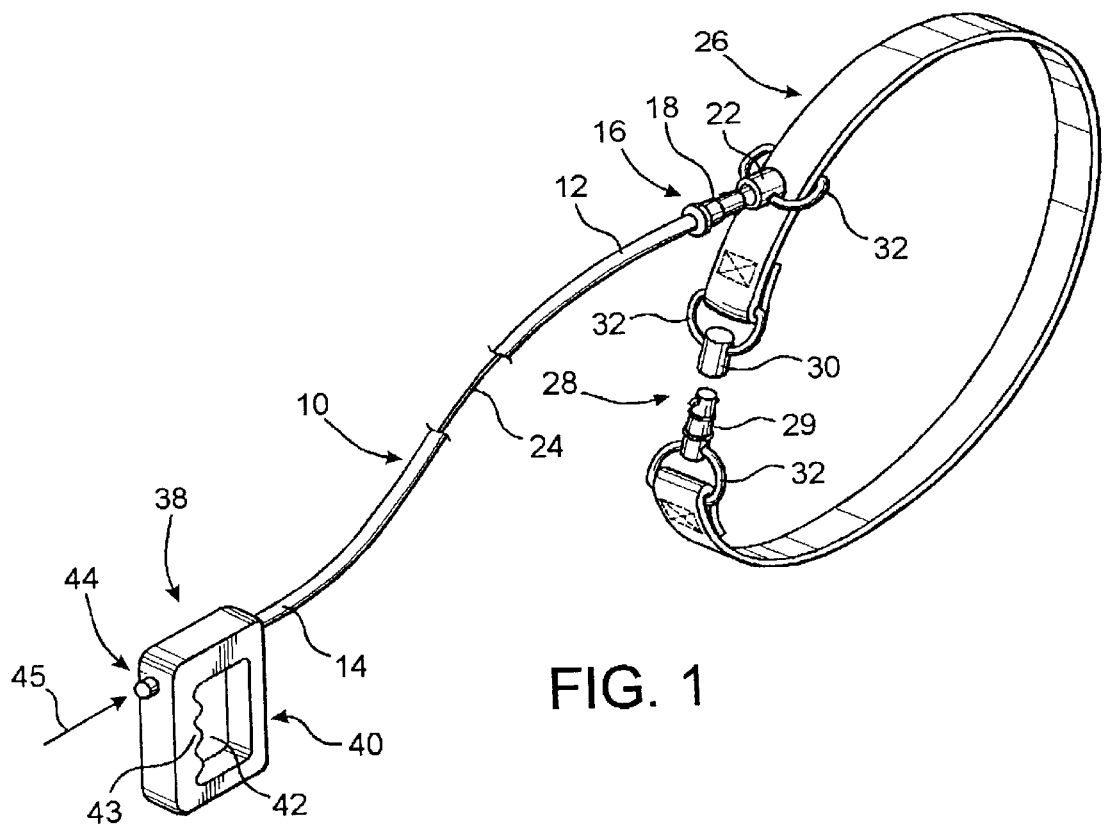
FIG. 1 is a perspective view in partial cutaway showing the various structural features of one preferred embodiment of the present invention.

As shown in the accompanying Figures, the present invention is directed towards a leash assembly wherein a preferred embodiment is disclosed in FIG. 1 and includes a lead structure as in 10 being of any applicable or desired length and further being formed of a flexible material so as to facilitate freedom of movement of both the animal and the handler or user of the subject assembly, and to a quick release coupling assembly which includes a coupling assembly generally shown as 16, a release structure generally shown as 24, and an activation assembly generally shown as 38, as disclosed herein.

The lead structure 10 terminates at a distal end 12 and a proximal end 14, which are oppositely disposed relative to one another. Moreover, a coupling assembly 16 is secured, at least in part, adjacent the distal end 12 of the lead structure 10 and includes a first component as in 18 and a second component as in 22. The first component 18 may be secured to the distal end 12 of the lead structure 10 and is connected to a release structure which may be defined in one embodiment by a release or positioning cable 24. With further reference to the coupling assembly 16, the second component 22 may be mounted on or attached to a collar, harness, or similar attachment assembly as at 26 designed to be mounted directly on the animal's body in the conventional fashion. Alternatively, the second component 22 may be secured to the distal end of a second lead structure as in a tie down assembly, or it may be secured to a fixed structure. Opposite ends of the attachment assembly 26 may define connectable portions and if desired may be removably attached using a substantially equivalent second coupling assembly generally indicated as 28 similar in operation to the coupling assembly 16 associated with the lead 10. Moreover, the attachment assembly 26 itself may be integrated as part of the present invention wherein the coupling assembly 28 incorporates specific structural improvements set forth in greater detail hereinafter which provides a quick and efficient attachment or coupling of opposite ends of the attachment assembly 26. The second coupling assembly 28 of the present invention also includes a first component 29 and a second component 30 designed to be removably and quickly attached and detached relative to one another so as to secure the attachment assembly 26 about the neck of the dog or other animal being tethered. Loop type connecting elements as at 32 may serve to movably mount or attach the components 29, 30 of the second coupling assembly 28 to the opposite ends of the attachment assembly 26.

A loop type connector 32 may also serve to movably mount the second component 22 of the coupling assembly 16 to the attachment assembly 26 such that the entire coupling assembly 16 is allowed to move freely along the length of the attachment assembly in order to provide the animal more freedom when connected to the lead structure 10 and also to reduce the possibility of tangling of the attachment assembly 26 with the remainder of the lead structure 10.

Figure 2:
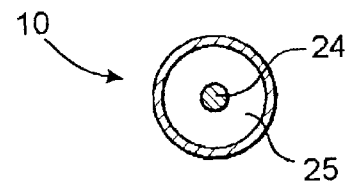
FIG. 2 is a sectional view along line 2—2 of FIG. 1.
Figure 2A:
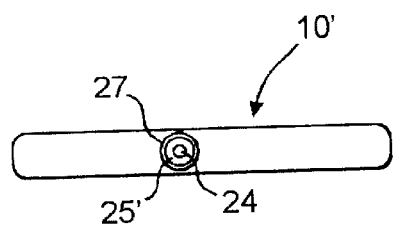
FIG. 2A is a sectional view of the lead of FIG. 4.

With reference to the embodiment of FIGS. 1 and 2, the release structure which comprises release cable 24 in a preferred embodiment, is preferably mounted within an interior 25 of an outer flexible material, such as lead structure 10, as illustrated in FIG. 2. The lead structure 10 may therefore assume a generally tubular configuration so as to enclose the release cable 24 in a hollow interior 25 thereof. Alternatively, as illustrated in FIG. 2A, a separate hollow sheath structure 27 may be provided and preferably secured to or embedded or concealed within the lead structure 10'. The sheath structure includes a hollow interior 25' and preferably extends along the entire length of the lead structure 10' so as to enclose the release cable 24 therein along substantially its entire length. Such a configuration is particularly beneficial in woven material lead structures, or if the lead structure is to be wound, because movement of the release cable 24 while in an at least partially wound position is required. In this embodiment, the sheath structure 27 is configured to facilitate the sliding movement of the release cable 24 relative to the lead structure 10'.

Figure 4:
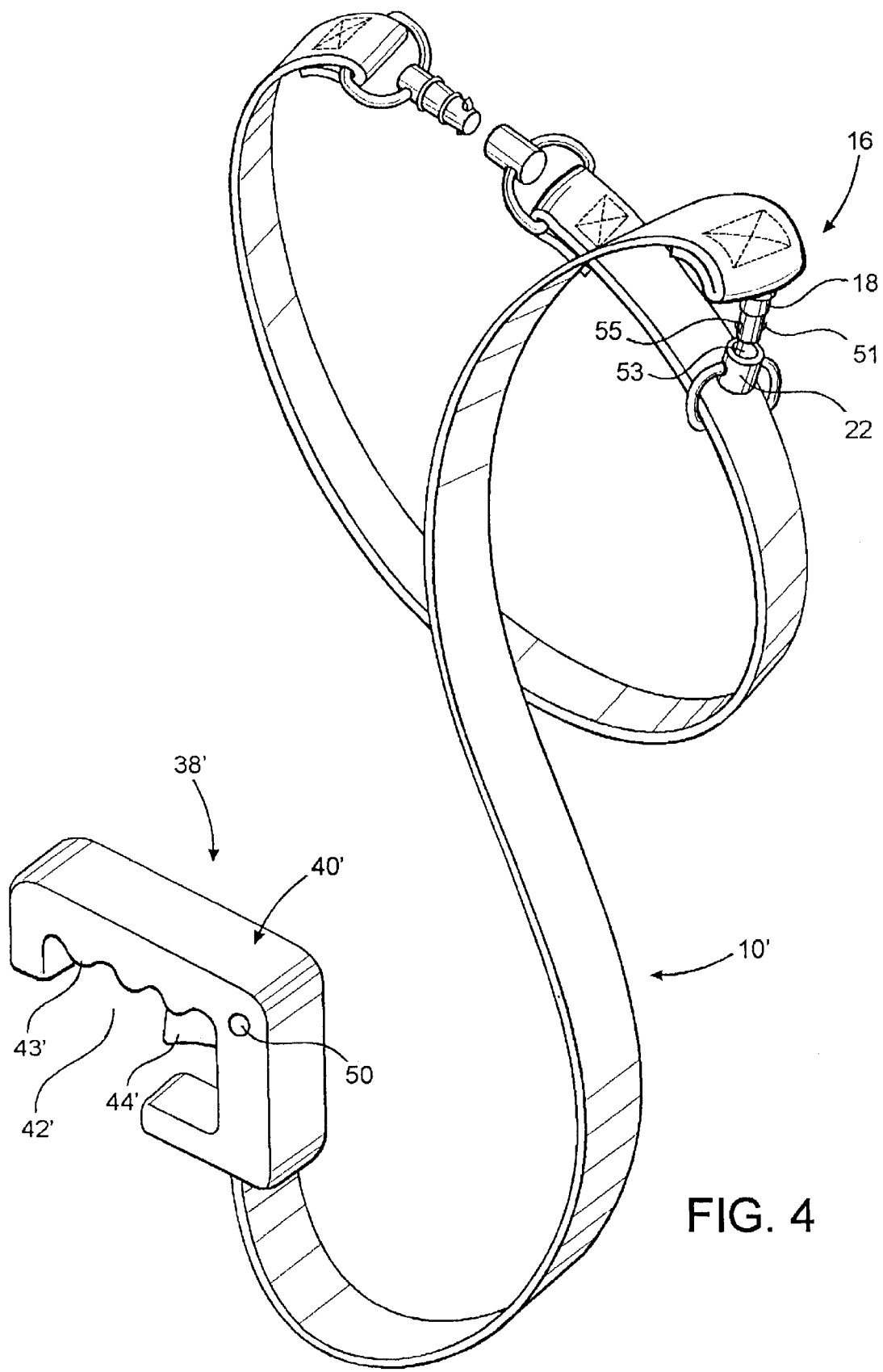
FIG. 4 is a perspective view showing yet another preferred embodiment of the present invention.
Figure 5:
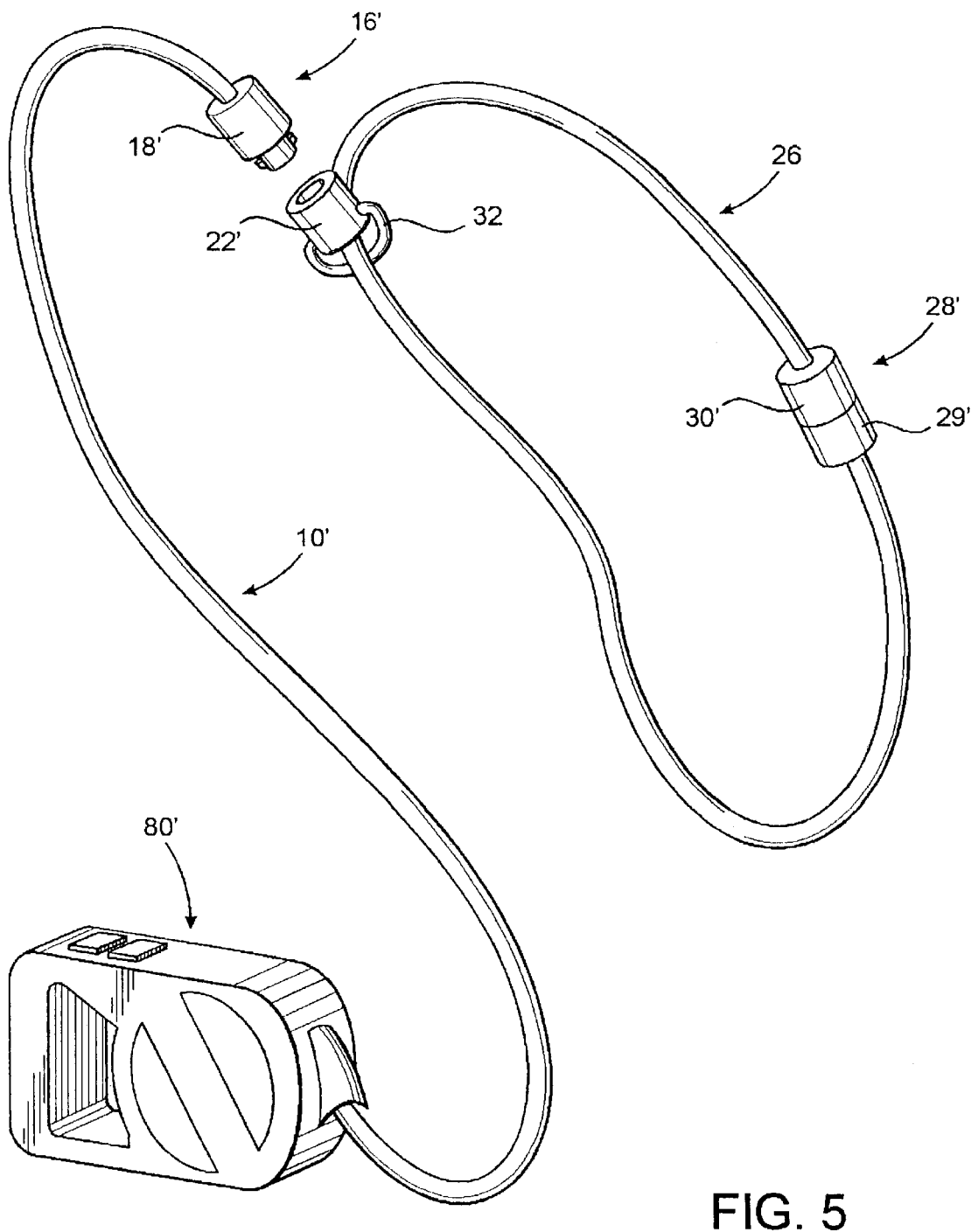
FIG. 5 is a perspective view of another, preferred embodiment of the present invention.
Figure 7C:
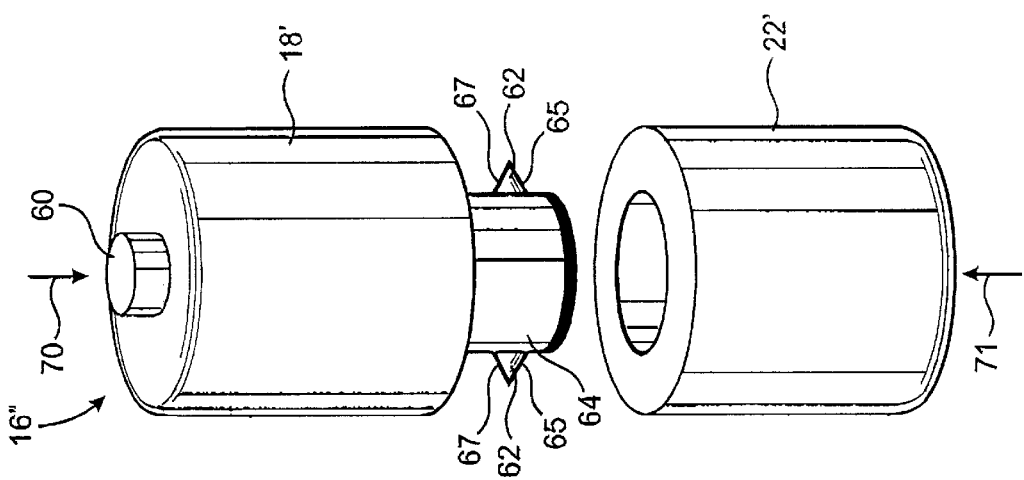
FIG. 7C is a perspective view of the coupling assembly of FIG. 7 illustrating locking members having a conical configuration.
Figure 7B:
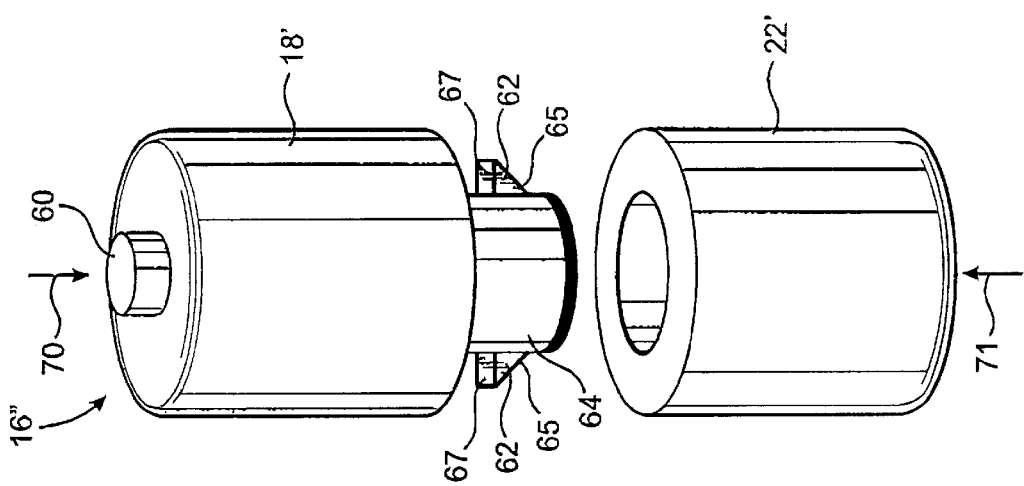
FIG. 7B is a perspective view of the coupling assembly of FIG. 7 illustrating locking members having a wedge shape configuration.
Figure 7A:
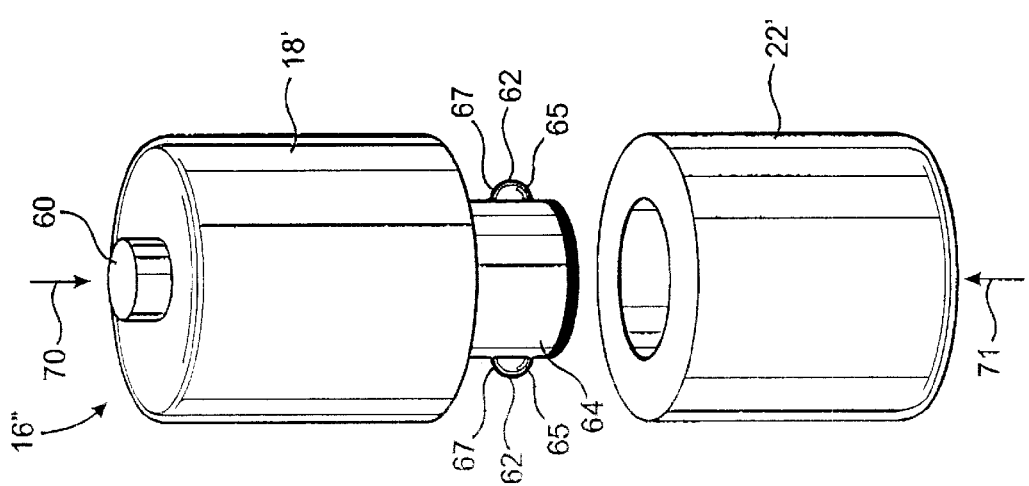
FIG. 7A is a perspective view of the coupling assembly of FIG. 7 illustrating locking members having a ball bearing configuration.
Figure 8A:
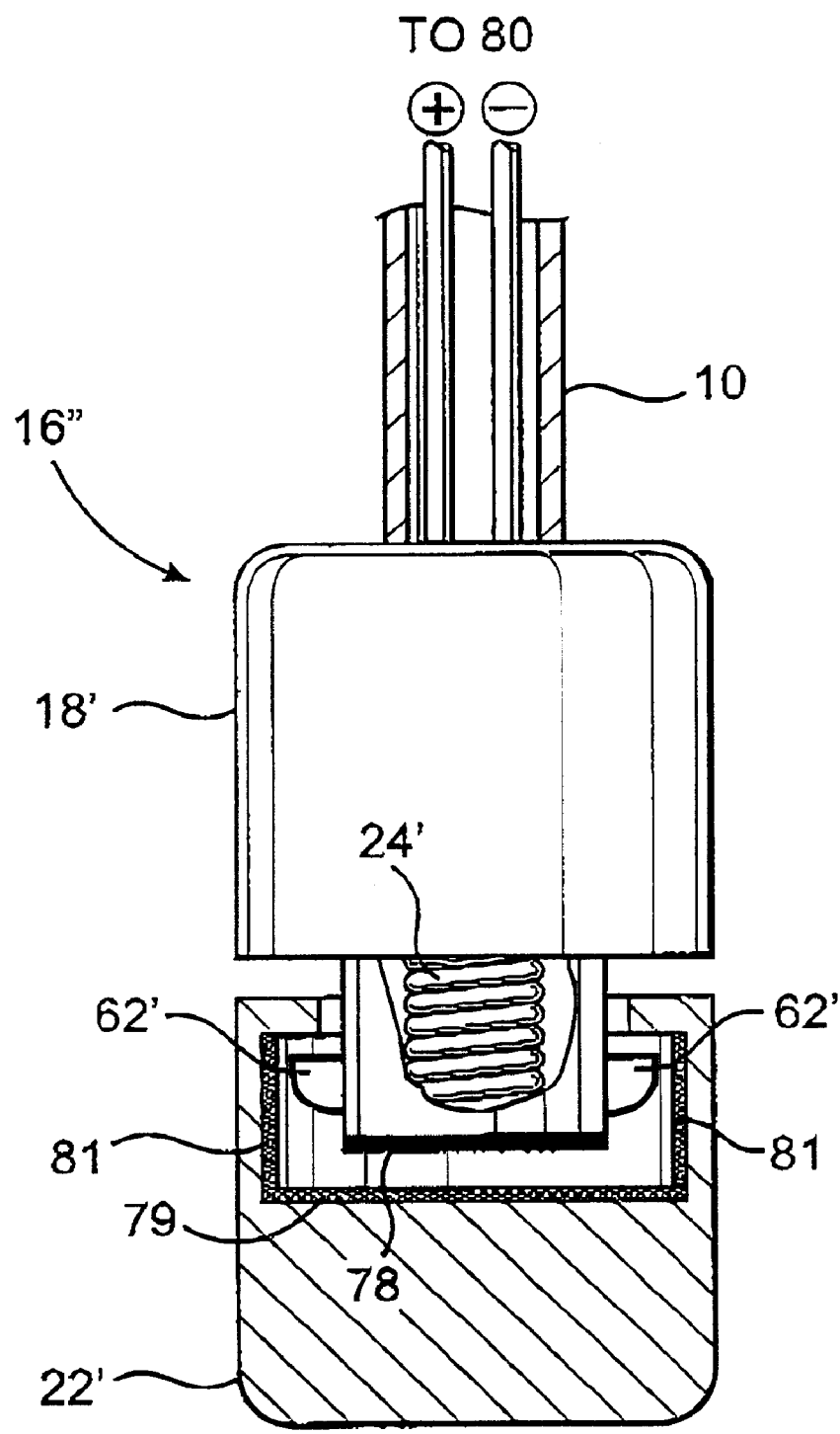
FIG. 8A is a front plan view of the embodiment of FIG. 8 illustrating release mechanism comprising an electromagnet.

As set forth above, the coupling assemblies 16 and/or 28 may be equivalently structured, and as also set forth above, additional, more preferred embodiments of the coupling assemblies 16 and 28 are shown in detail in FIGS. 6–8. With reference to FIG. 5, the coupling assembly incorporates the structural features of either of the embodiments of FIG. 6, or of FIGS. 7 and 8, which are represented as 16' and 16", respectively. With further reference to FIG. 4, couplings 16 and 28 may include a spring biased plunger 51, which when axially disposed inwardly into the housing 53 will serve to release the one, or preferably two outwardly extending, oppositely disposed locking members 62 from their normally biased outwardly extending orientation. In a preferred embodiment of the present invention, the locking members 62 will comprise an elongated finger configuration as illustrated in FIGS. 6–8 However, it is anticipated that the present invention may other configurations of locking members 62, encompass including but not limited to, ball bearings as shown in FIG. 7A, wedge shaped as shown in FIG. 7B, cone shaped as shown in FIG. 7C, etc. Release of the locking members 62 from their normally biased outwardly extending orientation will allow attachment of the male coupling member 18 to the female coupling member 22. For purposes of clarity the structural details of the preferred embodiments of FIG. 6 and FIGS. 7 and 8 are explained with reference to coupling assembly 16' and 16", respectively, as indicated in the aforementioned FIGS. It is again to be emphasized that the structural components of the coupling assembly 16' and 16" may be identical. A feature of the different embodiments of FIG. 6 and FIGS. 7 and 8 is the ability to accomplish a quick and efficient attachment and release of the components of the respective coupling assemblies, such as while utilizing only a single hand of the user. Further, attachment can be accomplished without the physical depression or other manipulation of a spring biased plunger 51 or any similar component.

More specifically, a feature of the embodiment of the coupling assembly 16' of FIG. 6 as well as the additional preferred embodiment 16" of FIGS. 7 and 8 is the inclusion of one or preferably two locking members 62 having an outer surface specifically configured to facilitate the quick and efficient attachment or release of the first component 18' to or from the second component 22'. In particular, each of the locking members 62 includes a leading surface portion 65 and a trailing surface portion 67. The locking members 62 are normally biased outwardly into locking engagement as shown in FIG. 6. Furthermore, the trailing surface portions 67 of each of the locking members 62 are configured into a transverse, linear shape so as define a stop member which will prevent inadvertent detachment of the first and second components 18' and 22" from one another such as when these components are inadvertently pulled apart due to strain from the animal or other forces. As such, it is necessary to affirmatively dispose the locking members 62 inwardly into the interior of the first component 18' in order to define a retracted orientation and allow passage of the leading end 64 of component 18' through the receiving aperture as at 69 formed in the second component 22'.

Looking in greater detail, the coupling assembly 16' comprises a first component 18' and a second component 22' which, as shown, are respectively configured to define a male coupling component and a female coupling component. At least one, preferably the male coupling component, is preferably structured to rotate or swivel, thereby allowing the entire coupling assembly 16' to be rotatable and swivelable to prevent tangling and the like. As explained above, the first component 18' may be connected to the distal or free end of the lead 10 and, more specifically, in direct operative attachment to the release structure, which in one preferred embodiment comprises an interior, axially moveable release cable 24. The release cable 24 may be connected directly to a plunger 60 so as to exert an axially directed force thereon which in turn permits the easy release of the first component 18' from the second component 22' by virtue of the fact that an axially directed pulling force will cause the plunger 60 to move outwardly against a force exerted thereon by a biasing spring (not shown). This outward movement of the plunger 60 will in turn cause the locking members 62 to be released from their normal outwardly locking engagement and pulled into a retracted orientation, thereby allowing the first component 18' to be easily released from the second component 22'.

In an alternate embodiment on or more of the coupling assembly 16', the locking members 62 and the second component 22' may comprise oppositely charged magnetic materials, such that the attractive and/or repulsive magnetic forces are sufficient to maintain the locking members 62 in an outwardly locking engagement. In this embodiment, the plunger 60 is connected to each locking member 62, wherein an outward axial force is required to reposition the locking members 62 from their normally biased outwardly locking engagement to the retracted orientation, so as to allow the first component 18' to be easily released from the second component 22'.

In yet a other embodiment of the coupling assembly 16', the locking members 62 may in whole or in part comprise a magnetically charged material. Additionally, the release structure comprises an electromagnet 24 which replaces the release cable 24 and plunger 60 and generates a stronger, similarly polarized magnetic field relative to the locking members 62 such that the repulsive magnetic forces are sufficient to force the locking members 62 into their outwardly locking engagement. To release the first component 18' from the second component 22' in this embodiment of the present invention, an electrical current may be applied to the electromagnet 24' which reverses its polarity, thus causing the locking members 62 to be pulled into a retracted orientation by magnetic attraction which permits the first component 18' to be easily release from the second component 22'. In such an embodiment, an independent biasing force on the locking members 62 may not be necessary.

Also as indicated, a further feature of the present invention is its ability to achieve easy and effective engagement or attachment between the first component 18' and the second component 22'. This attachment is preferably facilitated by virtue of the fact that the leading surface portion 65 of each of the locking members 62 has a substantially convergent configuration which extends outwardly in either a curvilinear or sloped shape. Accordingly, engagement of the leading surface portion 65 with the periphery of the receiving aperture 69 will cause a sliding engagement of the respective locking members 62 relative to the periphery of the receiving aperture 69 and thereby cause a forced, inward retraction of the locking members 62 to counter their normally biased outward orientation. The leading end 64 of the first component 18' will thereby be allowed to pass through the aperture 69 into the engaged and attached position as shown in FIGS. 6 and 8 in a substantially facilitated manner.

In order to accomplish such quick and easy attachment of the components 18' and 22' together into the attached position of FIGS. 6 and 8, the first and second components 18' and 22' should be disposed in predetermined aligned engagement with one another. Such predetermined aligned engagement may be defined by an axial alignment of the first component 18' with the second component 22' as best shown in FIG. 7. Once the first and second components 18' and 22' are in the aforementioned axial alignment, forced positioning of these two components 18' and 22' towards one another as indicated by directional arrows 70 and 71 will cause sliding contact of the leading surface portion 65 with the periphery of the receiving aperture 69 resulting in the predetermined aligned engagement of the first and second components 18' and 22'. The cooperatively structured configuration of the first and second components 18' and 22' of the preferred embodiment of the coupling assembly 16' allows the predetermined aligned engagement and attachment of the first and second component 18' and 22' by the user with a single hand.

As set forth above in order to accomplish a quick and easy attachment of the components 18' and 22' to one another in the locked position of FIGS. 6 and 8, the first and second component 18' and 22' are disposed in axial alignment with one another. To further assist the axial alignment of the first and second component 18' and 22', each of the embodiments of FIGS. 6 through 8 also preferably include an attraction assembly which facilitates such axial alignment. Such an attraction assembly is mounted on the coupling assembly 16' in the form of correspondingly positioned, attractive, mating or engaging surfaces. With regard to the embodiment of FIG. 6, the exposed annular surface 72 of the first component 18' is formed of a magnetic material and is configured to attract a similar annular surface 74 of the second component 22', which may also be formed of a magnetic material. In the locking position of FIG. 6, these surfaces will normally be brought into confronting engagement with one another. The provision of the magnetically attractive surfaces 72 and 74 and their relative disposition to one another will facilitate the axial alignment of the components 18' and 22' as well as the inwardly directed connecting force indicated by directional arrows 70 and 71 in order that the leading surface portions 65 of the locking members 62 will brought into direct engagement with the exposed, periphery of the receiving aperture 69, as set forth above.

In the embodiment of FIG. 6 the magnetically attractive surfaces 72 and 74 are substantially externally located when the first and second components 18' and 22' are separated from one another. Conversely the additional preferred embodiment of FIGS. 7 and 8 includes the magnetically attractive surfaces 78 and 79 disposed substantially interiorly but in the respective position of the first component 18' with the second component 22' as shown in FIG. 8.

In addition, the attraction assembly of the embodiment of FIG. 8 may also include interior side surfaces as at 81 which are designed to at least partially engage and cause the direct attraction of the locking members 62'. Accordingly, in the embodiment of FIG. 8 the locking members 62' are at least partially formed of a magnetically attractive material so as to facilitate the aforementioned predetermined aligned engagement of the first and second components 18' and 22' with one another.

Further with regard to FIG. 1, the present invention comprises an activation assembly generally indicated as 38. The activation assembly 38 is preferably, although not necessarily, integrated as part of a handle 40 structured to facilitate holding of the leash assembly during use. The handle 40 preferably includes a generally apertured construction 42 and further defines gripping means 43 dimensioned and configured to facilitate the holding or gripping of the handle 40 by a single hand of a user of the subject leash assembly. One feature of the present invention is the provision of an activation member as at 44 generally in the form of a spring biased push button, which, due to the force exerted thereon by a biasing spring (not shown for purposes of clarity) is preferably normally disposed in an outward position as shown. The activation assembly 44 is connected directly to a correspondingly positioned end of the release structure or release cable 24. The release cable 24, may be formed of a metallic material or other applicable materials. Regardless of the structural embodiments, release cable 24 should be sufficiently flexible to be rolled upon itself in a stored position or otherwise oriented as generally shown in FIG. 5, but should have sufficient structural integrity to be movable axially along its length, within the interior of the lead structure 10 and relative thereto. Such axial movement may be accomplished by a force exerted by the user of the subject assembly on the activation member or push button 44 as indicated by directional arrow 45.

With reference to FIG. 4, another preferred embodiment of the present invention comprises basic structural features similar to the embodiment of FIG. 1 and with the exception that the lead structure 10' has a somewhat flat strap like configuration extending along its length. However, at least a portion of the lead 10' defines a hollow interior along the entire length thereof for the positioning and axial movement of the release structure or cable 24. Moreover, as illustrated in FIG. 2A, a sheath structure 27 may be disposed within the lead structure 10'.

The activation assembly 38' of the embodiment of FIG. 4 is associated with a handle structure 40' having a somewhat different configuration than that of the embodiment of FIG. 1. More specifically, the handle 40' comprises an open, central aperture construction 42' having a grip 43' designed to facilitate gripping by one hand of the user of the subject assembly. However, in this embodiment the activation assembly 38' comprises an activation member 44' in the form of a trigger type switch positionable for operation by a single finger of the gripping hand of the user of the subject assembly. The activation member 44' is normally biased into its outermost position, as shown in FIG. 4, by any type of biasing spring or the like. However, depression or movement of the activation member 44' to an inner position serves to axially move the release structure or cable 24. Such axial movement will exert an outward axial force on the plunger 60 which will serve to release the first component 18 of the coupling assembly 16 from the second component 22. Additional embodiments of the activation assembly are disclosed, such as 80' in FIG. 5, which is similar in structure and operation to activation assembly 80, as described hereinafter for the embodiment of FIG. 9.

An additional structural feature of the embodiment of FIG. 4 and in particular the actuation assembly 38' is the inclusion of a lock structure indicated as 50. The lock structure 50 may have any applicable or adequate structure secured to handle 40' so as to prevent the depression or inward travel of the actuation member 44'. This will prevent the inadvertent detachment of the coupling assembly 16 and eliminate the possibility of accidently releasing or detaching the animal from the lead 10'.

Figure 3:
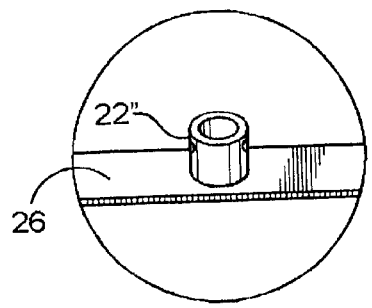
FIG. 3 is a detailed view showing another embodiment of the present invention.

With regard to FIG. 3, an alternate embodiment is disclosed wherein the second component indicated as 22" is fixedly mounted on an exterior surface of the attachment assembly 26. The structural features of the second component 22" are similar to that of the second component 22 of FIG. 1 in that it is designed to removably receive the first component 18 therein.

Figure 9:
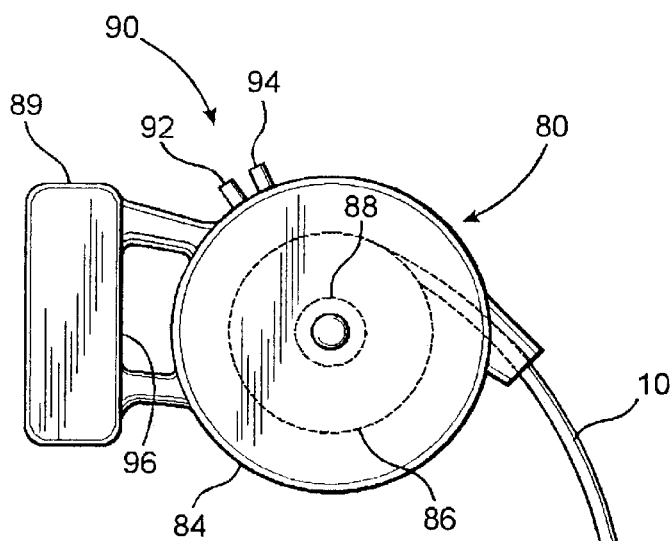
FIG. 9 is a side view of yet another preferred embodiment of an activation assembly associated with the leash assembly of the present invention.
Figure 10:
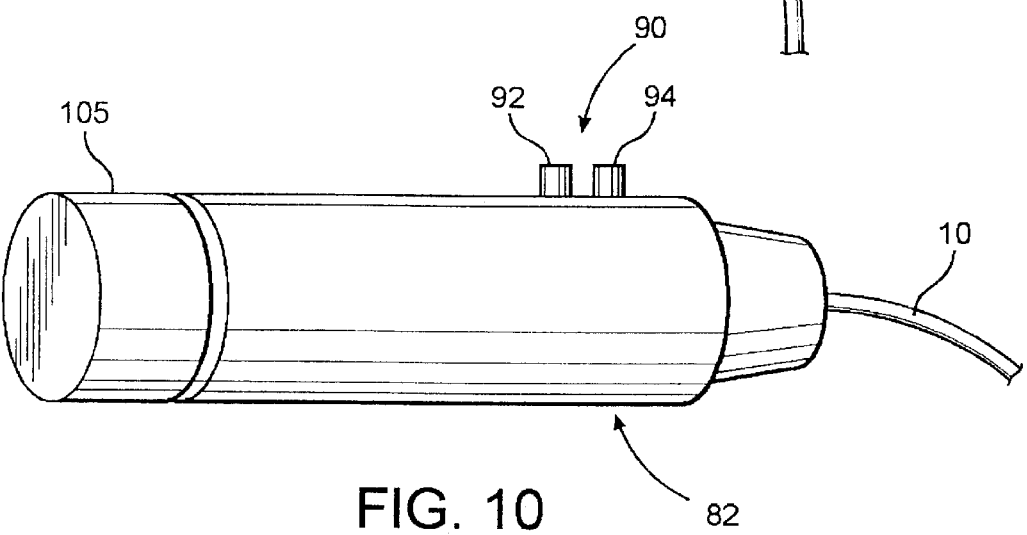
FIG. 10 is an external, perspective view of yet another embodiment of an activation assembly associated with the leash assembly of the present invention.
Figure 11:
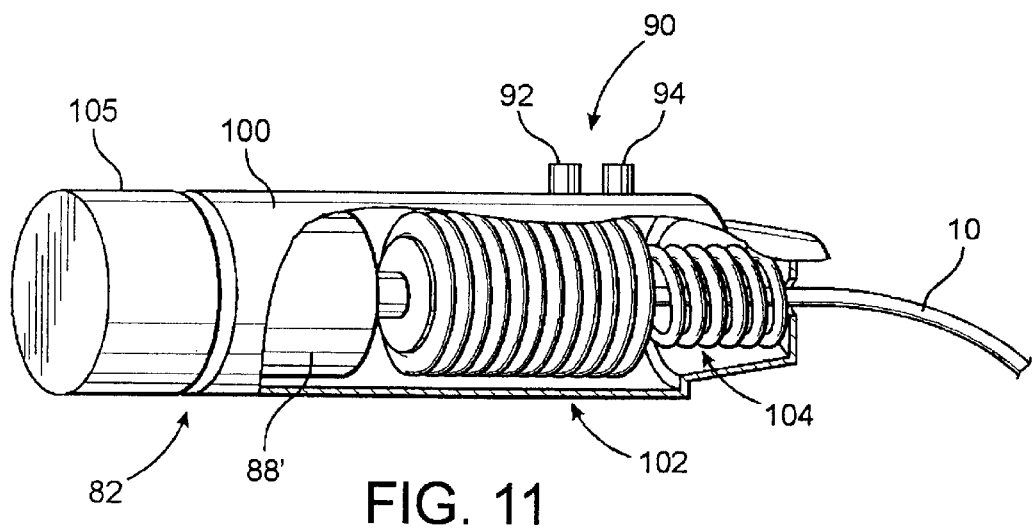
FIG. 11 is a perspective view showing interior structural details of the embodiment of FIG. 10.

Additional preferred embodiments of the present invention are shown in FIG. 9, and FIGS. 10 and 11, and relate to an activation assembly generally indicated as at 80 or 82, respectively. With regard to the embodiment of FIG. 9, the activation assembly 80 includes a housing 84 having an at least partially hollow interior for the mounting and enclosure of a storage or take-up spool indicated in phantom lines as 86. The take-up spool 86 is rotationally mounted on the interior of the housing 84 and, more specifically, is operated by a drive motor schematically represented in phantom line as 88. The drive motor 88 is electrically powered and is specifically structured to be reversible so as to rotate the take-up spool 86 in opposite directions. The opposite directions of rotation of the drive motor 88 serve to either take-in or feed-out the lead 10 thereby allowing complete control over a tethered animal attached to the distal or free end of the lead structure 10. By virtue of the "powered driving" mechanism comprising the drive motor 88, a user or handler of the subject leash assembly is allowed to avoid the disadvantages associated with spring driven, retractable take up structures of the type typically found in conventional retractable leash assemblies. Further with regard to the embodiment of FIG. 9 the housing 84 includes a handle portion generally indicated as 89 which may be dimensioned and configured to have a hollow interior so as to house the electrical power supply used to energize the drive motor 88. Such power supply of course may be in the form of rechargeable direct current batteries or any other type of applicable power supply structured to supply sufficient power to operate the drive motor 88. Further, a switching assembly is generally indicated as 90, wherein one or more switches as at 92 may be used to operate the drive motor 88 and an additional one or two switches as at 94 are used to axially move the aforementioned release cable 24 so as to cause the release of components 18 and 22 of the coupling assembly 16. It should also be noted that the overall configuration of the housing 84 could be such as to include an apertured configuration as at 96 which along with the dimension and configuration of the battery casing segment 89 may form a handle or grip to facilitate carrying or manipulation of the activation assembly 80.

With regard to the additional preferred embodiment of FIGS. 10 and 11, the activation assembly 82 comprises a housing as at 100 having a substantially hollow interior configuration for the mounting of a drive motor 88' and a storage or take up spool generally indicated as 102. The take up spool 102 may have a spiral configuration which stores the lead 10 about the length of the take up spool 102 wherein a cushioning spring as at 104 is provided to cushion the movement of the lead 10 into and out of the housing 100. Again, the drive motor 88' is structured to be reversible so as to selectively accomplish both the take-in and feed-out of the lead 10 relative to take up or storage spool 102. A switching assembly generally indicated as at 90 is also mounted on the housing 100 operatively associated with the drive motor 88' and to the release structure in the form of release cable 24 as explained above. A separable casing segment 105 may be provided to enclose and secure a rechargeable battery therein, wherein the entire casing 105 and the battery mounted on the interior thereof may be removed from the remainder of the housing 100 for purposes of recharging or replacing.

Of course, however, in either of the powered embodiments, the drive motor 88 or 88' may be configured to only manipulate the release cable 24, with the lead structure 10 itself being either of a fixed length or retractable. For example, in an embodiment with a long lead 10 or wherein the lead is substantially wound in a stored orientation, a greater force may be required to actuate the release cable 24. As such, the drive motor could be used solely for the release cable 24. Additionally, whether the drive motor provides for powered movement of the lead and/or the release cable 24, a one way drive motor could also be effectively employed so long as an automatically or affirmatively releasing engagement with the retracted lead structure 10 is achieved. For example, if the lead structure 10 is taken up by the drive motor 88 or 88' a similar release as to that which is normally provided to release an inward spring bias can be employed to allow the lead structure 10 to be let out without causing or requiring a reversal of the drive motor 88 or 88'. Also, as to the release cable 24, only a momentary axial force applied to the release cable 24 is required to release the first component 18 from the second component 22. As such, the drive motor 88 or 88' could be configured to pull on the release cable 24 a limited amount of time, after which it may automatically back out after which a normal bias on the release cable 24 can cause a clutch type release.

Another embodiment of the activation assembly may include an electrical power supply operatively associated with the electromagnet 24' of the alternative embodiment of the release structure 24 prevented above. The activation assembly operates by providing sufficient electrical current to the electromagnet 24' to reverse its polarity such that it is opposite that of the locking members 62. This is opposite magnetic force causes the locking members 62 to be pulled from their normally biased outwardly locked engagement to retracted orientation permitting the first and second components 18' and 22' to be easily released from one another.

As in previously described powered embodiments, a switching assembly 90 may be employed to activate the electrical current to the electromagnet 24' when quick and easy release of the first and second components 18' and 22' is desired. Each of the powered embodiments of the activation assembly presented herein may additionally comprise a radio receiver 99, as illustrated in FIG. 9, capable of activating or deactivating the drive motor 88 or 88' and/or the electromagnet 24' from a remote location via a radio transmitter. In this embodiment, a radio receiver 99 may be operatively connected to the activation assembly 80 or 82, which is structured to receive predetermined signal(s) from a remotely located radio transmitter. Once the transmitted radio signal is received, the radio receiver 99 triggers the switch assembly 90 such that the activation assembly 80 or 82 causes either the drive motor 88 or 88' or the electromagnet 24' to activate the release structure 24, allowing the first and second components 18' thereby and 22' to be easily released from one another, or to cause the drive motor 88 or 88' to take-up or feed-out the lead structure.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A leash assembly designed to provide both quick attachment and quick release of an animal therefrom, said assembly comprising:
    a) a lead structure having a proximal end and an oppositely disposed distal end,
    b) an attachment assembly configured for removable attachment to the animal,
    c) a release structure movably mounted on said lead structure and extending along a length thereof, wherein said release structure includes a first end disposed adjacent said distal end and a second end disposed adjacent said proximal end,
    d) a coupling assembly including a first component connected to said first end of said release structure and a second component mounted on said attachment assembly,
    e) said first and second components cooperatively structured to allow the user to manipulate said components into predetermined aligned engagement and attchment with one another with a single hand,
    f) said first and second components further structured to be released from one another upon disposition of said release structure into a disconnect position,
    g) an activation assembly operatively associated with said release structure and configured to selectively dispose said release structure into and out of said disconnect position, and
    h) said first component further comprising two spaced apart locking members movably mounted thereon, said locking members including a leading surface portion and a trailing surface portion, wherein each of said trailing surface portions further define a stop member of a substantially linear configuration,
    i) said locking members are disposed in a normally biased outwardly locking engagement.

2. An assembly as recited in claim 1 wherein said release structure is configured so as to position said locking members into a retracted orientation when disposed into said disconnect position.

3. An assembly as recited in claim 1 wherein said first and second components each comprise an alignment assembly cooperatively structured and disposed to facilitate axial alignment of said first and second components.

4. An assembly as recited in claim 3 wherein said alignment assemblies comprise magnetic surfaces structured and disposed to facilitate said axial alignment of said first and second components.

5. An assembly as recited in claim 1 wherein said leading surface portion of each of said locking members is structured and disposed to force said locking members into a retracted orientation upon engagement with said second component.

6. An assembly as recited in claim 5 wherein said leading surface portion of each of said locking members comprises a substantially divergent, curvelinear configuration extending outwardly from said trailing surface portion.

7. An assembly as recited in claim 6 wherein said locking members further comprise magnetic material disposed such that said locking members are magnetically attracted to the interior of said second component with sufficient magnetic force to maintain said locking members in said normally biased outwardly locking engagement.

8. An assembly as recited in claim 7 wherein said release structure is operatively connected to said locking members and is configured to reposition said locking members into said retracted orientation when disposed in said disconnect position.

9. An assembly as recited in claim 5 wherein each of said stop members is structured and disposed to maintain each of said locking members in a normally biased outwardly locking engagement when said first and second components are disposed in said predetermined aligned engagement.

10. A leash assembly to provide both quick attachment and quick release, said leash assembly comprising:
    a) a lead structure having a substantially hollow interior along its length and terminating at a proximal end and an oppositely disposed distal end,
    b) an attachment assembly including two connectable portions to facilitate removable attachment of said attachment assembly to the animal,
    c) a release structure mounted on said lead structure and axially moveable relative thereto into and out of a disconnect position,
    d) said release structure including a first end disposed adjacent said distal end and a second end disposed adjacent said proximal end,
    e) a first coupling assembly including a first component connected to said first end of said release structure and a second component mounted on said attachment assembly, said first and second components structured to be released from one another upon disposition of said release structure into a disconnect position,
    f) a second coupling assembly including a first component and a second component each connected to a different one of said two connectable portions,
    g) said first and second components of said first and second coupling assemblies cooperatively structured to be attached when disposed in predetermined aligned engagement with one another,
    h) said first and second components of each of said first and second coupling assemblies cooperatively structured to allow the user to manipulate said components into said predetermined aligned engagement with a single hand,
    i) an activation assembly operatively associated with said release structure configured to selectively dispose said release structure into and out of said disconnect position, and
    j) said first component of said first coupling assembly having at least one locking member movably mounted thereon and positionable between a normally biased outwardly locking engagement and a retracted orientation, said one locking member having a leading surface portion disposed in sliding engagement with said second component when in said predetermined aligned engagement, said at least one locking member structured and disposed to be positionable into said retracted orientation and structured to be in said normally biased outwardly locking engagement with said second component upon release from said retracted orientation.

11. An assembly as recited in claim 10 wherein said first component of said first coupling assembly comprises at least two locking members disposed in spaced relation to one another, each of said locking members movably mounted and positionable between said normally biased outwardly locking engagement and said retracted orientation, each of said locking members having a leading surface portion disposable in sliding engagement with said second component when in said predetermined aligned engagement, said locking members being structured and disposed to be positionable into said retracted orientation and to be in said normally biased outwardly locking engagement with said second component upon release from said retracted orientation.

12. An assembly as recited in claim 11 wherein said release structure is operatively associated with said locking members so as to position said locking members into said retracted orientation upon disposition thereof into said disconnect position.

13. An assembly as recited in claim 12 wherein said leading surface portion of each of said locking members is structured to force said locking members into said retracted orientation upon engagement with said second component.

14. An assembly as recited in claim 13 wherein said locking members further comprise magnetic material disposed such that said locking members are magnetically attracted to the interior of said second component with sufficient magnetic force to maintain said locking members in said normally biased outwardly locking engagement.

15. An assembly as recited in claim 14 wherein said release structure is operatively connected to said locking members and configured to reposition said locking members into said retracted orientation when disposed in said disconnect position.

16. An assembly as recited in claim 15 wherein said locking members comprise an elongated finger configuration.

17. An assembly as recited in claim 15 wherein said locking members comprise a ball bearing configuration.

18. An assembly as recited in claim 15 wherein said locking members comprise a conical configuration.

19. An assembly as recited in claim 15 wherein said locking members comprise a wedge shape configuration.

20. A leash assembly comprising:
    a) a lead structure having a substantially hollow interior along its length and terminating at a proximal end and an oppositely disposed distal end,
    b) an attachment assembly including two connectable portions positionable in corresponding relation to one another to facilitate removable attachment of said attachment assembly to the animal,
    c) a release structure mounted on said lead structure and axially moveable relative thereto into and out of a disconnect position,
    d) said release structure including a first end disposed adjacent said distal end and a second end disposed adjacent said proximal end,
    e) a first coupling assembly including a first component connected to said first end of said release structure and a second component mounted on said attachment assembly, wherein said first and second components are structured to be released from one another upon disposition of said release structure into a disconnect position,
    f) a second coupling assembly including a first component and a second component each connected to a different one of said two connectable portions,
    g) said first and second components of both said first and second coupling assemblies cooperatively structured to assume an attached position when disposed in predetermined aligned engagement with one another,
    h) said first and second components of each of said first and second coupling assemblies being structured and disposed to be manipulated into said predetermined aligned engagement by a single hand of a user,
    i) an activation assembly operatively associated with said release structure configured to selectively dispose said release structure into and out of said disconnect position, and
    j) said first component of said first coupling assembly further comprising at least two locking members each having a leading surface portion and a trailing surface portion wherein said trailing surface portion defines a stop member having a substantially linear configuration.

21. An assembly as recited in claim 20 wherein said leading surface portion of each of said locking members is structured and disposed to force each of said locking members into a retracted orientation upon engagement with said second component.

22. An assembly as recited in claim 21 wherein each of said stop members is structured and disposed to maintain each of said locking members in a normally biased outwardly extending locking engagement when said first and second components are disposed in said predetermined aligned engagement.

23. An assembly as recited in claim 22 wherein said locking members further comprise magnetic material disposed such that said locking members are magnetically attracted to the interior of said second component with sufficient magnetic force to maintain said locking members in said normally biased outwardly locking engagement.

24. An assembly as recited in claim 23 wherein said release structure is operatively connected to said locking members and configured to reposition said locking members into said retracted orientation when disposed in said disconnect position.

25. A leash assembly designed to provide both quick attachment and quick release of an animal therefrom, said assembly comprising:
    a) a lead structure having a proximal end and an oppositely disposed distal end,
    b) an attachment assembly structured and configured for removable attachment to the animal,
    c) a release structure movably mounted on said lead structure and extending along a length thereof, wherein said release structure includes a first end disposed adjacent said distal end and a second end disposed adjacent said proximal end,
    d) a coupling assembly including a first component connected to said first end of said release structure and a second component mounted on said attachment assembly,
    e) said first and second components cooperatively structured to assume an attached configuration when disposed in predetermined aligned engagement with one another,
    f) said first component comprising at least two outwardly extending spaced apart locking members movably mounted thereon and disposable into and out of a retracted orientation, wherein each of said locking members includes a leading surface portion and a trailing surface portion, and
    g) said first and second components further structured to be detached from another upon disposition of said release structure into a disconnect position.

26. An assembly as recited in claim 25 wherein said locking members further comprise magnetic material disposed such that said locking members are magnetically attracted to the interior of said second component with sufficient magnetic force to maintain said locking members in a normally biased outwardly locking engagement.

27. An assembly as recited in claim 26 wherein said release structure is operatively connected to said locking members and configured to reposition said locking members into said retracted orientation when disposed in said disconnect position.

28. An assembly as recited in claim 27 wherein said locking members comprise a ball bearing configuration.

29. An assembly as recited in claim 27 wherein said locking members comprise a conical configuration.

30. An assembly as recited in claim 25 further comprising an activation assembly operatively associated with said release structure and configured to selectively dispose said release structure into and out of said disconnect position, wherein said activation assembly is electronically operated.

31. An assembly as recited in claim 30 wherein said activation assembly further comprises a radio receiver structured and disposed so as to operate said activation assembly upon transmission of a predetermined radio signal from a remote location.

32. An assembly as recited in claim 25 wherein said locking members further comprise magnetic material and said release structure comprises an electromagnet structured and disposed to force said locking members into a normally biased outwardly locking engagement with said second component by inducing an opposite magnetic charge on said electromagnet relative to said locking members.

33. An assembly as recited in claim 32 further comprising an activation assembly operatively associated with said release structure and configured to selectively dispose said release structure into and out of said disconnect position by alternating the magnetic charge on said electromagnet, wherein said activation assembly is electronically operated.

34. An assembly as recited in claim 33 wherein said activation assembly further comprises a radio receiver structured and disposed so as to operate said activation assembly upon transmission of a predetermined radio signal from a remote location.

35. An assembly as recited in claim 34 wherein said trailing surface portion defines a stop member having a substantially linear configuration.

36. An assembly as recited in claim 35 wherein said locking members comprise an elongated finger configuration.

37. An assembly as recited in claim 35 wherein said locking members comprise a wedge shape configuration.

38. A quick release coupling assembly to provide both quick attachment and quick release between two elements, said coupling assembly comprising:
 a) a first component and a second component cooperatively structured to assume an attached orientation when disposed in predetermined aligned engagement with one another,
 b) said first component comprising at least one locking member movably mounted thereon and disposable into and out of a retracted orientation, said at least one locking member further including a leading surface portion and a trailing surface portion,
 c) said first and second components further structured to be detached from one another upon disposition of a release structure into a disconnect position thereby disposing said at least one locking member into said retracted orientation,
 d) said release structure connected to said first component structured such that said first and second components are easily released from one another upon disposition of said release structure whereby said release structure is positionable into said disconnect position upon operation of an activation assembly, and
 e) said at least one locking member further comprises magnetic material disposed such that said at least one locking member is magnetically attracted to the interior of second component in a radially and outwardly extending orientation with sufficient magnetic force to maintain said at least one locking member in a normally biased outwardly locking engagement.

39. An assembly as recited in claim 38 wherein said release structure is operatively connected to said at least one locking member and configured to reposition said at least one locking member into said retracted orientation when disposed in said disconnect position.

40. An assembly as recited in claim 39 wherein said trailing surface portion defines a stop member having a substantially linear configuration.

41. An assembly as recited in claim 40 wherein said at least one locking member comprises an elongated finger configuration.

42. An assembly as recited in claim 40 wherein said at least one locking member comprises a wedge shape configuration.

43. An assembly as recited in claim 38 wherein said activation assembly is operatively associated with said release structure and configured to selectively dispose said release structure into and out of said disconnect position, said activation assembly further being electronically operated.

44. An assembly as recited in claim 43 wherein said activation assembly further comprises a receiver structured and disposed so as to operate said activation assembly upon transmission of a predetermined signal from a remote location.

45. An assembly as recited in claim 38 wherein said at least one locking member further comprises magnetic material and said release structure comprises an electromagnet structured and disposed to force said at least one locking member into a normally biased outwardly locking engagement with said second component by applying an opposing magnetic charge on said electromagnet relative to said at least one locking member.

46. An assembly as recited in claim 45 wherein said activation assembly is operatively associated with said release structure and configured to selectively dispose said release structure into and out of said disconnect position by alternating the magnetic charge on said electromagnet, said activation assembly further being electronically operated.

47. An assembly as recited in claim 46 wherein said activation assembly further comprises a receiver structured and disposed so as to operate said activation assembly upon transmission of a predetermined signal from a remote location.

48. An assembly as recited in claim 47 wherein said at least one locking member comprises a ball bearing configuration.

49. An assembly as recited in claim 47 wherein said at least one locking member comprises a conical configuration.

50. A leash assembly to provide both quick attachment and quick release, said leash assembly comprising:
 a) a lead structure having a substantially hollow interior along its length and terminating at a proximal end and an oppositely disposed distal end, b) an attachment assembly including two connectable portions to facilitate removable attachment of said attachment assembly to the animal, c) a release structure mounted on said lead structure and axially moveable relative thereto into and out of a disconnect position, d) said release structure including a first end disposed adjacent said distal end and a second end disposed adjacent said proximal end, e) a first coupling assembly including a first component connected to said first end of said release structure and a second component mounted on said attachment assembly, said first and second components structured to be released from one another upon disposition of said release structure into a disconnect position, f) a second coupling assembly including a first component and a second component each connected to a different one of said two connectable portions, g) said first and second components of said first and second coupling assemblies cooperatively structured to be attached when disposed in predetermined aligned engagement with one another, h) said first and second components of each of said first and second coupling assemblies cooperatively structured to allow the user to manipulate said components into said predetermined aligned engagement with a single hand, i) an activation assembly operatively associated with said release structure configured to selectively dispose said release structure into and out of said disconnect position, j) said first component of said first coupling assembly having at least one locking member movably mounted thereon and positionable between a normally biased outwardly locking engagement and a retracted orientation, said at least one locking member having a leading surface portion disposed in sliding engagement with said second component when in said predetermined aligned engagement, said at least one locking member structured and disposed to be positionable into said retracted orientation and structured to be in said normally biased outwardly locking engagement with said second component upon release from said retracted orientation, and k) said at least one locking member comprising a ball bearing configuration.

* * * * *